United States Patent [19]
Nakada

[11] Patent Number: 5,694,122
[45] Date of Patent: Dec. 2, 1997

[54] JAM INFORMATION DISPLAY USING AN ARROW WHOSE ATTRIBUTE VALUE CHANGES FROM A JAM TAIL TO A JAM HEAD

[75] Inventor: Masaki Nakada, Kanagawa, Japan

[73] Assignee: Matsushita Electric Industrial Co., Ltd., Osaka, Japan

[21] Appl. No.: 748,985

[22] Filed: Nov. 14, 1996

[30] Foreign Application Priority Data

Nov. 17, 1995 [JP] Japan .................. 7-299443

[51] Int. Cl.⁶ .................................................. G08G 1/123
[52] U.S. Cl. ........................ 340/990; 340/988; 364/449.5
[58] Field of Search ........................ 340/990, 988, 340/995; 364/449.5

[56] References Cited

U.S. PATENT DOCUMENTS 5,293,163  3/1994  Kakihara et al. .............. 340/988
5,383,128  1/1995  Nishida et al. ................ 340/990
5,398,189  3/1995  Inoue et al. ................. 364/449.5
5,442,557  8/1995  Kaneko ........................ 340/990
5,459,824  10/1995  Kashiwazaki ................. 340/990
5,465,088  11/1995  Braegas ....................... 340/990
5,537,323  7/1996  Schulte ....................... 364/449.5

FOREIGN PATENT DOCUMENTS 4-38599  2/1992  Japan .
7-49991  2/1995  Japan .

Primary Examiner—Jeffery Hofsass
Assistant Examiner—John Tweel, Jr.
Attorney, Agent, or Firm—Pearne, Gordon, McCoy & Granger LLP

[57] ABSTRACT

An arrow directed from the tail to the head of a jam is displayed on a map along a jammed road in its jammed section such that the attribute of the arrow changes from the jam tail to the jam head. Examples of the attribute of the arrow are color and the interval of adjacent dots of a dotted arrow.

6 Claims, 2 Drawing Sheets

JAM INFORMATION DISPLAY USING AN ARROW WHOSE ATTRIBUTE VALUE CHANGES FROM A JAM TAIL TO A JAM HEAD

BACKGROUND OF THE INVENTION

1. Field of the Invention

The present invention relates to a road traffic information display method and apparatus which display road traffic information, particularly jam information, sent from an external system so that it is superimposed on a road map being displayed on a display screen that is provided in the self vehicle.

2. Description of the Related Art

A vehicular navigation system is known which performs a simple operation of displaying a measured position of the self vehicle so that it is superimposed on road map information that is stored in a device incorporated in the self vehicle. The read-time information to be displayed is only the self vehicle position. Therefore, to obtain traffic information that varies moment by moment such as jam information or information on a road traffic restriction caused by a traffic accident, the driver is obliged to rely on external displays such as jam display boards of, for instance, the Tokyo metropolitan expressways. Further, this vehicular navigation system has a problem that the road map information provided in the self vehicle may become out of date due to a modification of roads, for instance.

On the other hand, there have been developed vehicular information systems in which information is transmitted in the form of FM multiplexed broadcast or from a base station or road-side beacons, received by a receiver of a vehicle, and then displayed in the vehicle. For example, in a system developed for the metropolitan expressways of the Tokyo central area, jam information, restriction information, accident information, etc. relating to the entire metropolitan expressways are transmitted from a base station, and are displayed on a display device incorporated in a vehicle. This system allows the display device of a vehicle to perform display similar to that of jam information display boards that are currently provided at a little more than 10 locations of the Tokyo metropolitan expressways. This system prevents a case that a vehicle passes a conventional display board that is installed above or at the side of a road without sufficient recognition of its content by the driver. Rather, the driver can obtain information when he needs it.

For example, Japanese Unexamined Patent Publication No. Hei. 4-38599 discloses the above type of apparatus which displays externally provided information in a vehicle. This apparatus informs the driver of jam information by displaying, on a map, a jammed road in a color different than the other roads, for instance. This apparatus can also inform the driver of the degree of the jam by changing the color in accordance with the degree of the jam. The driver can select a route in consideration of the existence of jams and their degrees.

However, although the apparatus of the above publication can display the existence of jams within a display range of the screen and their degrees, to recognize the length of a jam the driver needs to trace the jammed road being displayed on the screen with this eyes. Further, if the head of a jam is located outside the screen, he cannot recognize the length of a part of the jam located outside the screen.

For example, Japanese Unexamined Publication No. Hei. 7-49991 discloses an apparatus which solves the above problem that occurs when the head of a jam is located outside the display screen. Where the head of a jam is located outside the screen, an arrow is displayed adjacent to where the displayed jammed road meets the boundary of the screen and a number indicating the jam length is also displayed adjacent to the arrow as shown in FIG. 5. Thus, this apparatus can provide the driver with information of a jam part that is located outside the screen.

In an example picture of FIG. 5, a road map 201, a present position 202 and a running direction 203 of the self vehicle, jam information items 204 and 205, and jam-length-indication numbers 206 are displayed on a screen 200 of the display so as to be superimposed on each other. While the heads of the jam information items 204 are located within the screen, the actual heads of the jam information items 205 are located outside the screen. Each jam-length-indication number 206 indicates the entire length of the associated jam. Thus, the driver can obtain information of the entire length of a jam by looking at the associated jam-length-indication number 206.

However, in the above conventional apparatus, the same kind of arrow is displayed irrespective of whether the actual head of a jam is located inside or outside the display screen. Further, since the length of a jam whose head is located outside the screen is represented by a number, it is difficult for the driver to instantaneously recognize it while he is driving.

SUMMARY OF THE INVENTION

An object of the present invention is therefore to provide a road traffic information display method and apparatus which, in superimposing jam information on a map, allows the driver to easily recognize the entire jam length as well as a residual jam length as measured from the present position of his own vehicle.

To attain the above object, according to the invention, in a road traffic information display method and apparatus which display road traffic information sent from an external system on a road map being displayed on a display screen that is provided in the self vehicle, jam information that is included in the traffic information is displayed in the form of an arrow directed from the tail to the head of a jam along a jammed road in its jammed section such that the attribute of the arrow changes from the jam tail to the jam head. With the above method and apparatus, the driver is allowed to easily recognize the entire jam length and a residual jam length.

DESCRIPTION OF THE PREFERRED EMBODIMENTS

Embodiments of the present invention will be hereinafter described with reference to the accompanying drawings.

Figure 1:
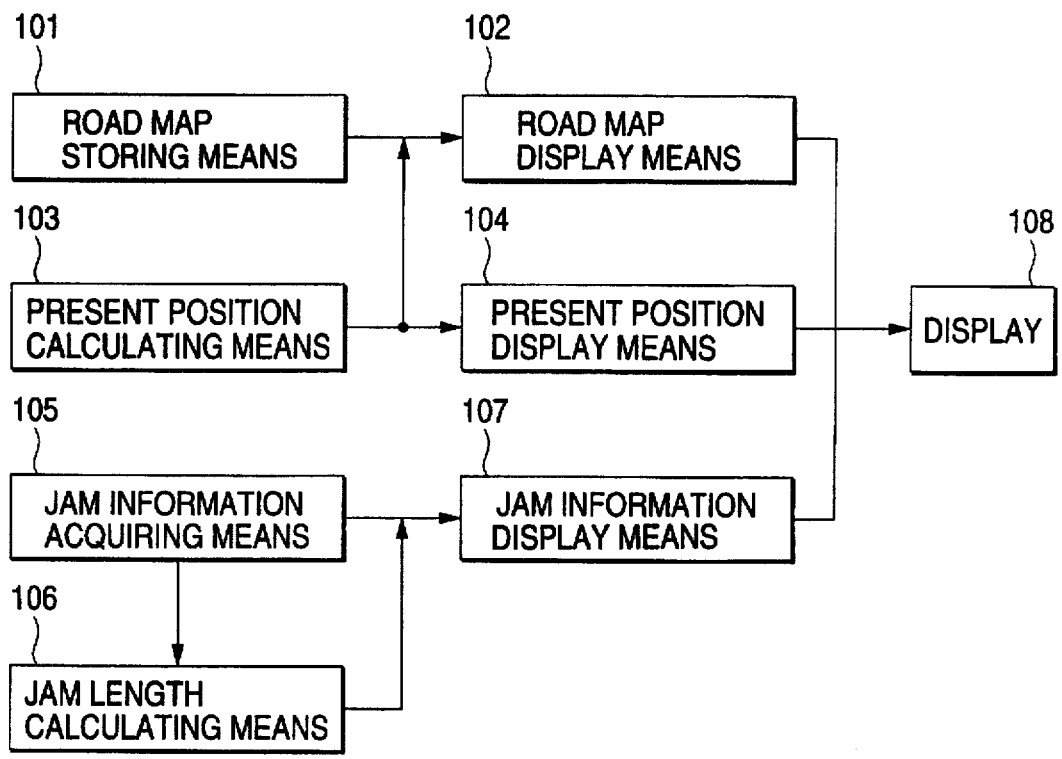
FIG. 1 is a block diagram showing the configuration of a road traffic information display apparatus according to an embodiment of the present invention.

FIG. 1 shows the configuration of a road traffic information display apparatus according to an embodiment of the invention. In FIG. 1, a road map storing means 101 stores road map information. A road map display means 102 displays the stored road map information. A present position calculating means 103 calculates the present position of the self vehicle. A present position display means 104 displays the calculated present position on a road map. A jam information acquiring means 105 acquires jam information from road traffic information that is sent from an external system. A jam length calculating means 106 calculates the entire jam length based on the acquired jam information. A jam information display means 107 displays the jam information as an arrow. Reference numeral 108 denotes a display.

The operation of the embodiment will be described below. First, the present position calculating means 103 calculates the present position of the self vehicle. The road map display means 102 reads, from the road map storing means 101, a road map corresponding to the present position of the self vehicle as calculated by the present position calculating means 103, and displays it on the display 108. Further, the present position display means 104 displays the present position and the running direction of the self vehicle on the display 108 so that they are superimposed on the road map.

On the other hand, the jam information acquiring means 105 acquires jam information from road traffic information that is sent from the external system. The jam length calculating means 106 calculates the entire length of a jam based on the acquired jam information. Based on the acquired jam information and the calculated jam length, the jam information display means 107 displays an arrow on the display 108 such that its attribute gradually changes from the tail to the head of the jam. The arrow, the road map, and the present position and the running direction of the self vehicle are superimposed on each other.

Figure 2:
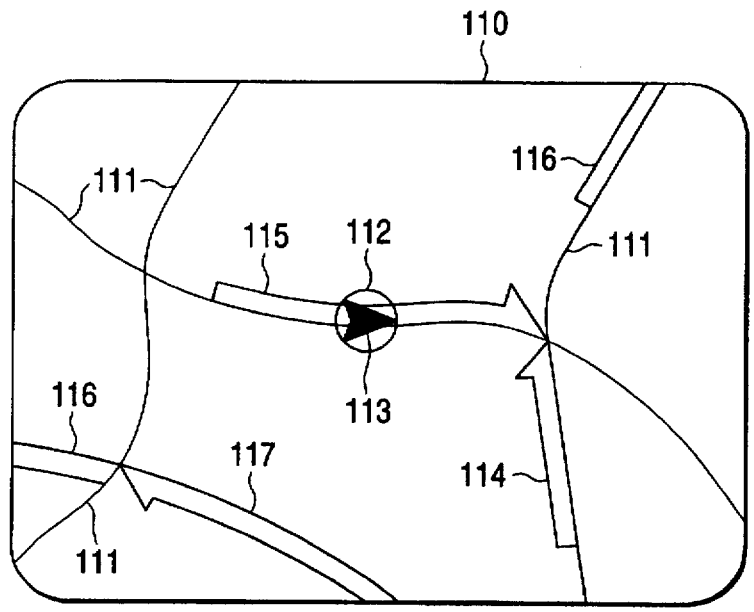
FIG. 2 shows an example picture displayed by a road traffic information display apparatus of FIG. 1.

FIG. 2 shows an example picture appearing on the display 108 (see FIG.1 ) according to this embodiment. In FIG. 2, a road map 111, a present position 112 and a running direction 113 of the self vehicle, and jam information items 114–117 are displayed on a display screen 110 so as to be superimposed on each other. The jam information items 114–117 are so displayed that the attribute of each arrow gradually changes from its tail to head (though FIG. 2 is not drawn in such a manner).

Figure 3:
FIG. 3 shows an example of an arrow of jam information display in which the color gradually changes from a jam tail to a jam head.

FIG. 3 shows an arrow of jam display in which the color (i.e., attribute) gradually changes from a jam tail 121 to a jam head 122. The rate of color change depends on the jam length while each of the jam tail 121 and the jam head 122 is always given the same color. The driver can easily know the entire jam length by recognizing the rate of color change of the related arrow being displayed on the screen 110 of the display 108.

Where the self vehicle is currently located on a jammed road as in the case of the jam information item 115 (see FIG. 2), a color-varied arrow of jam display allows the driver to easily recognize a residual jam length as measured from the present position of the self vehicle. Even where the head of a jam exists outside the screen 110 as in the case of the jam information item 116, the driver can easily recognize the length of a non-displayed part of the jam.

In the example of FIG. 3, the rate of attribute value change (i.e., color change) depends on the jam length while each of the jam tail 121 and the jam head 122 is always given the same color. Alternatively, the rate of attribute value change may be fixed, in which case the jam head 122 is always given the same attribute value. In this case, the driver can know the entire jam length by recognizing the attribute value of the jam tail 121. Further, he can easily recognize a residual jam length as measured from the present position of the self vehicle and the length of a jam whose head 122 is located outside the screen 110.

Figure 4:
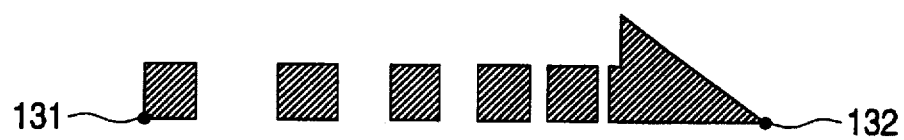
FIG. 4 shows another example of an arrow of jam information display in which the interval between adjacent dots of a dotted arrow gradually changes from a jam tail to a jam head.
Figure 5:
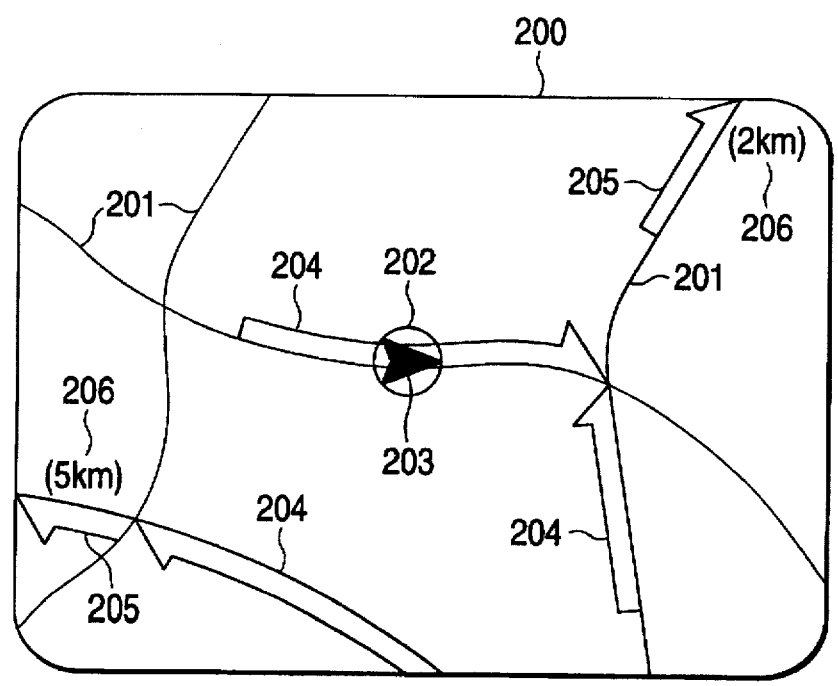
FIG. 5 shows an example picture displayed by a conventional road traffic information display apparatus.

FIG. 4 shows another example of jam display in which the jam information display means 107 displays a dotted arrow such that the interval between adjacent dots gradually changes from a jam tail 131 to a jam head 132. This type of dotted-arrow display may be combined with the above color change.

Other examples of attributes whose value is changed gradually from the tail to the head of an arrow include brightness, hue, width, and an arbitrary, predetermined pattern. Any other attribute may be used as long as it allows recognition of a jam length.

What is claimed is:

1. A road traffic information display method comprising the steps of:

displaying a road map on a display screen that is provided in a self vehicle;

calculating an entire length of a jam based on jam information included in road traffic information that is sent from an external system; and displaying, on the displayed map, an arrow directed from a jam tail to a jam head along a jammed road in a jammed section thereof such that an attribute of the arrow gradually changes from the jam tail to the jam head, based on the jam information and the calculated entire length of the jam.

2. The road traffic information display apparatus according to claim 1, wherein the attribute is color.

3. The road traffic information display apparatus according to claim 1, wherein the arrow is a dotted arrow and the attribute is an interval of adjacent dots of the dotted arrow.

4. A road traffic information display apparatus comprising:

road map display means for displaying a road map on a display screen that is provided in a self vehicle;

jam length calculating means for calculating an entire length of a jam based on jam information included in road traffic information that is sent from an external system; and jam information display means for displaying, on the displayed map, an arrow directed from a jam tail to a jam head along a jammed road in a jammed section thereof such that an attribute of the arrow gradually changes from the jam tail to the jam head, based on the jam information and the calculated entire length of the jam.

5. The road traffic information display apparatus according to claim 4, wherein the attribute is color.

6. The road traffic information display apparatus according to claim 4, wherein the arrow is a dotted arrow and the attribute is an interval of adjacent dots of the dotted arrow.

* * * * *